United States Patent [19]
Nasu et al.

[11] Patent Number: 5,467,461
[45] Date of Patent: Nov. 14, 1995

[54] MULTIPROCESSOR COMPUTER SYSTEM HAVING BUS CONTROL CIRCUITRY FOR TRANSFERRING DATA BETWEEN MICROCOMPUTERS

[75] Inventors: Masaki Nasu; Hajime Sakuma, both of Tokyo, Japan

[73] Assignee: NEC Corporation, Tokyo, Japan

[21] Appl. No.: 910,780

[22] Filed: Jul. 8, 1992

[30] Foreign Application Priority Data

Jul. 11, 1991 [JP] Japan .................................. 3-170812

[51] Int. Cl.⁶ ............................. G06F 13/00; G06F 13/42
[52] U.S. Cl. ..................... 395/474; 395/280; 364/DIG. 1; 364/134
[58] Field of Search ................................... 395/425, 325, 395/200; 364/134

[56] References Cited

U.S. PATENT DOCUMENTS

| | | | |
|---|---|---|---|
| 4,470,113 | 9/1984 | Oura | 395/325 |
| 4,503,497 | 3/1985 | Krygowski | 395/425 |
| 5,253,346 | 10/1993 | Okabayashi et al. | 395/325 |

*Primary Examiner*—Glenn Gossage
*Attorney, Agent, or Firm*—Whitman, Curtis, Whitman & McGinn

[57] ABSTRACT

A multiprocessor system includes first and second microcomputers, a address decoding mechanism, and a ready signalling device. The address decoder is coupled to an address bus, to decode address information transferred by the second microcomputer, and supplies a request signal to a request signal input terminal of the first microcomputer. A bus control unit of the first microcomputer responds to the request signal to detect whether an internal bus of the first microcomputer is free from being used by the CPU, and outputs an acknowledge signal to an acknowledge signal output terminal when the internal bus is free. The ready signaling device is coupled to the acknowledge signal output terminal to supply the ready signal to a ready signal input terminal of the second microcomputer in response to the acknowledge signal outputted at the acknowledge signal output terminal and the request signal. The bus control unit of the first microcomputer further responds to a strobe signal transferred to a strobe signal input terminal through a strobe signal line from the second microcomputer to access an address of the internal memory by using the address information transferred to a set of first address terminals through the address bus and performs a data read/write operation on the address of the internal memory through the internal bus.

16 Claims, 14 Drawing Sheets

MULTIPROCESSOR COMPUTER SYSTEM HAVING BUS CONTROL CIRCUITRY FOR TRANSFERRING DATA BETWEEN MICROCOMPUTERS

BACKGROUND OF THE INVENTION

1. Field of the Invention

The present invention generally relates to communications between computers in a multi-processor system and, more particularly, to a microcomputer suitable for use in a multi-processor system which facilitates communicating between processors through a memory.

2. Description of the Prior Art

In a multi-processor system including a plurality of microcomputers, data transfer between the microcomputers is necessary. To this end, a dual-port memory capable of being referenced by each of the microcomputers is typically connected between the microcomputers and data is transferred between the microcomputers in such a way that one of the microcomputers reads data from the dual-port memory, which has been written in the dual-port memory by the other microcomputer.

Such a multi-processor microcomputer system will be described in detail with reference to FIGS. 1 and 2. FIG. 1 is a block diagram of an example of a microcomputer system, which is includes two microcomputers 500 and 550 and a dual-port memory 560. The microcomputer 500 and the dual-port memory 560 are connected to each other by a) an external address bus 501 for outputting a memory address with which the microcomputer 500 references or accesses the dual-port memory, b) an external data bus 502 for transferring write/read dam between the microcomputer 500 and the dual-port memory 560, c) an external R/W signal line 503 which indicates whether the memory reference operation of the microcomputer is write ("0" signal level) or is read ("1" signal level), and d) an external strobe (DSTB) signal line 504 for timing write/read to the memory 560 by the microcomputer 500. Similarly, the microcomputer 550 and the dual-port memory 560 are connected to each other by an external address bus 551, an external data bus 552, an external R/W signal line 553 and an external DSTB signal line 554.

Now, an operation of the microcomputer 500 when it accesses the dual-port memory 560 will be described. FIG. 2(a) shows a timing chart for a case where the microcomputer 500 writes data in the dual-port memory 560. The microcomputer 500 outputs "0" (indicating write) to the external R/W signal line 503 at a time instance $t_{61}$, and further outputs a) a memory address onto the external address bus 501 for performing a memory write and b) provides data onto the external data bus 502. Then, during a time period $t_{62}$–$t_{63}$, a data write is performed to the dual-port memory 560 by outputting an active level "0" to the external DSTB signal line 504.

FIG. 2(b) is a timing chart for a case where the microcomputer 500 reads data from the dual-port memory 560. The microcomputer 500 outputs "1" (indicating read) on the external R/W signal 503 at a time instance $t_{71}$, outputs a memory address onto the external address bus 501 for performing a memory read, and puts the external data bus 502 in a high impedance state. Then, during a period $t_{72}$–$t_{73}$, data is outputted from the dual-port memory 560 to the external data bus 502 by outputting an active level "0" to the external DSTB signal line 504, and the microcomputer 500 then completes the data read from the dual-port memory 560 by reading the data off external data bus 502. Data read/write of the microcomputer 550 for the dual-port memory 560 is performed using similar procedures. Thus, dam transfer between the microcomputers is performed by accessing the dual-port memory 560 by both microcomputers.

In the conventional microcomputer system as described above, although data transfer is performed between the microcomputers 500 and 550 by the external connection of the dual-port memory 560, the dual-port memory 560 is expensive compared with an ordinary memory, resulting in a substantially increased cost for the system as a whole. Further, since the dual port memory 560 is externally attached, the number of parts increases, causing loss of reliability of the whole system.

SUMMARY OF THE INVENTION

It is therefore an object of the present invention to economically provide for the transfer of data between microcomputers in a multiprocessor microcomputer system.

Another object of the present invention is to provide improved reliability in the transfer of data between microcomputers in a multiprocessor microcomputer system.

It is also an object of the present invention to provide a multiprocessor microcomputer system which can share a terminal for the external memory reference and a terminal for the internal memory reference.

It is a further object of the invention to connect external memory to a multi-processor microcomputer system without increasing the number of terminals of a microcomputer.

It is also an object of the invention to restrict the design steps required to add external memory to a multi-processor microcomputer system.

According to the present invention, there is provided a microcomputer by which the problems of the prior art are solved, which microcomputer can be realized economically with a simple circuit construction and which can provide improved reliability. The construction of the present invention, in a microcomputer having a central processing unit and an internal memory containing data capable of being referenced during an execution of an instruction in the central processing unit, comprises a) an internal bus for transferring an address and data of the internal memory to which the central processing unit references, b) an internal memory control signal line for transmitting a control signal for data reference to the internal memory, and c) a bus control portion for outputting a bus use grant signal when i) the internal bus is in a non-use state and ii) an external bus request signal is received and concurrently connects the internal bus and the memory control signal to an external terminal.

As described hereinbefore, the present invention can economically constitute a multi-processor microcomputer system which can transfer data between a plurality of microcomputers through a memory without the necessity of using expensive dual-port memory. Further, since it is possible to constitute the system without externally attaching a memory, it is possible to improve the reliability of the whole system. Further, the practical effects thereof are very remarkable. Specifically, a) it is possible to share a terminal of the microcomputer for an external memory reference and a terminal for an internal memory reference, b) connection of external memory can be realized without increasing the number of microcomputer terminals, and c) it is possible to restrict a increase of design steps (such as board design and the like due to an increase of the number of terminals and related connections).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 3:
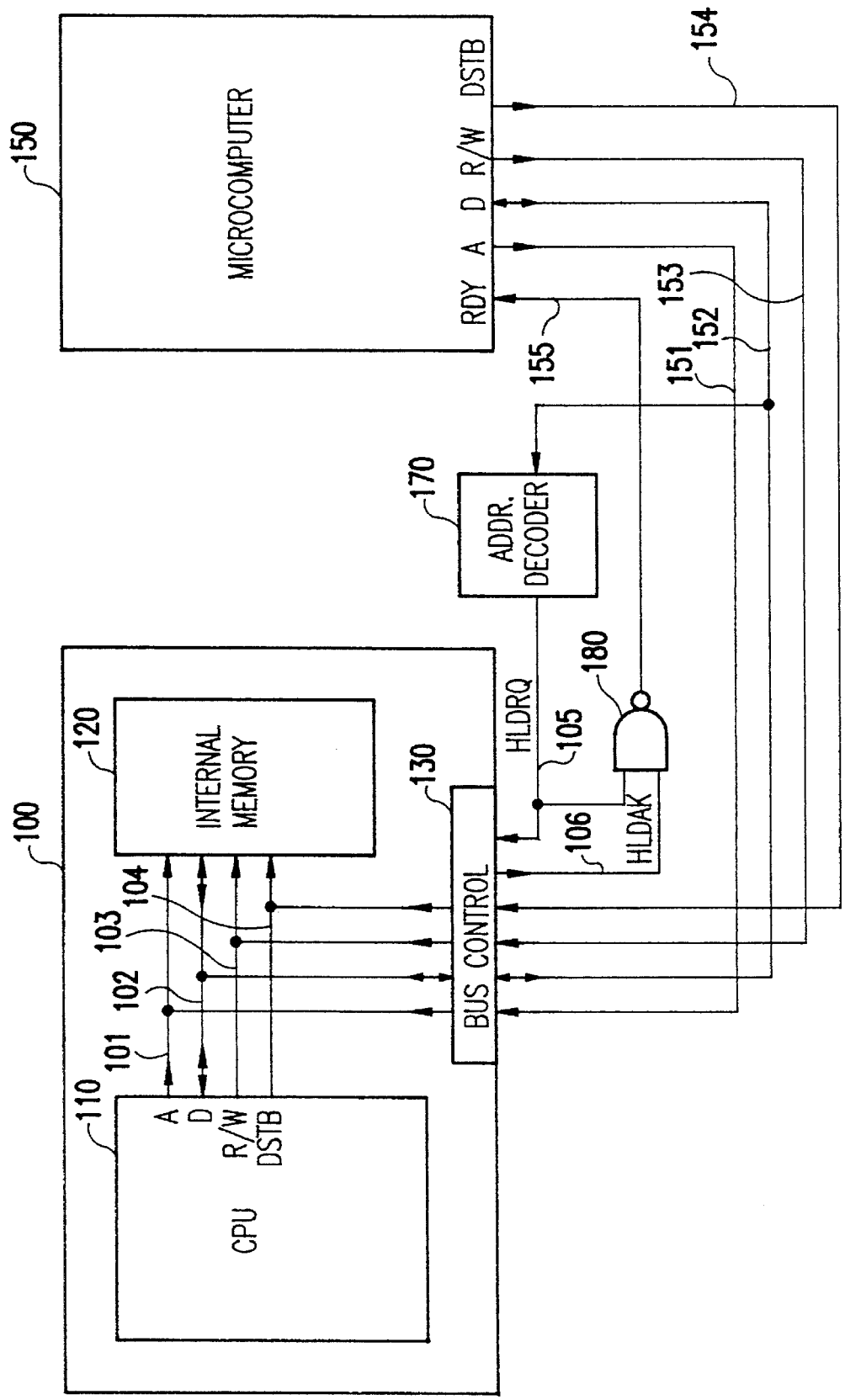
FIG. 3 is a block diagram of a microcomputer system according to a first embodiment of the present invention.

Referring now to the drawings, and more particularly to FIG. 3, a block diagram of a multi-processor microcomputer system according to a first embodiment of the present invention is shown. This multi-processor system comprises a microcomputer 100, a microcomputer 150 and an address decoder 170. The microcomputer 100 comprises a central processing unit (CPU) 110, an internal memory 120 capable of being written to and read from the CPU 110, and a bus control portion 130 for performing external and internal bus control. The internal memory 120, the CPU 110 and the bus control portion 130 are connected to each other by an internal address bus 101 for mutual transfer of a reference address during memory access, an internal data bus 102 for transfer of data during memory access, an internal R/W signal line 103 indicating the memory reference write/read status (by "0" signal level when write and "1" signal level when read), and an internal DSTB signal line 104 assigning a timing of write/read to the memory.

Further, the microcomputer 150 and the microcomputer 100 are connected to each other by an external address bus 151 for outputting a reference address when the microcomputer 150 accesses the memory, an external data bus 152 for transfer of dam during memory access, an external R/W signal line 153 indicating whether the memory reference performed by the microcomputer 150 is write ("0" signal level) or read "1" signal level), and an external DSTB signal line 154 for timing write/read for the memory.

The address decoder 170 outputs a request signal (HLDRQ) "1" on line 105 to the microcomputer 100 when the address outputted by the microcomputer 150 on the external address bus 151 refers to the internal memory 120 within the microcomputer 100. The HLDRQ "1" signal on line 105 requests an external access to the internal memory 120 of the microcomputer 100. The microcomputer 100 outputs an acknowledge signal (HLDAK) on line 106 which becomes "0" when access requested by the HLDRQ signal on line 105 is accepted. The HLDRQ signal on line 105 and the HLDAK signal on line 106 are inputted to a NAND gate 180 which outputs a READY signal on line 155 to the microcomputer 150. The microcomputer 150 stops its memory access from the internal memory 120 of microcomputer 100 when the READY signal on line 155 becomes "0" during the memory access and does not continue its memory access until the READY signal on line 155 becomes "1".

Figure 4A:
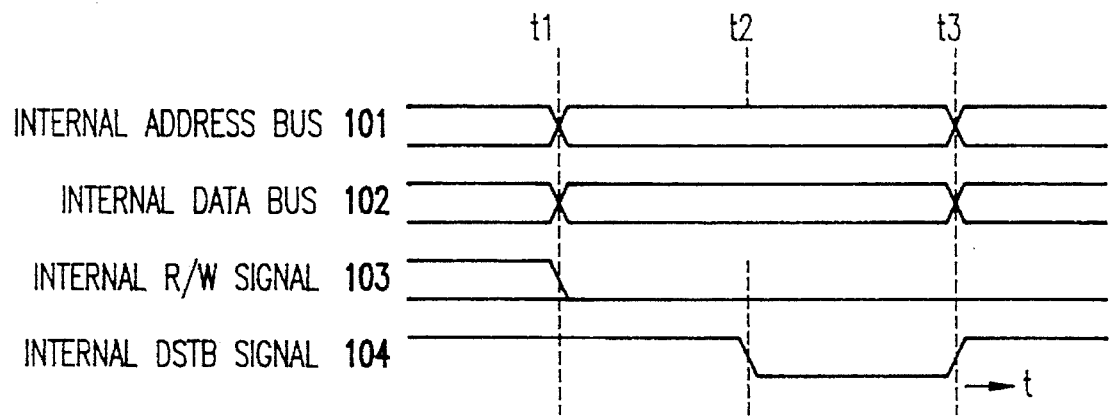
FIGS. 4(a) and 4(b) are timing charts of a write to the internal memory of a first microcomputer by that microcomputer's internal central processing unit (CPU) and an external microcomputer, respectively, of the embodiment of FIG. 3.

Now, an operation of this system in a case where it performs a memory reference will be described with reference to timing charts shown in FIGS. 4 and 5. FIG. 4(a) shows the timing chart for data write to the internal memory 120 by the CPU 110. The CPU 110 outputs "0" on the internal R/W signal line 103 at a time $t_1$, indicating a memory write operation. At time $t_1$, CPU 110 also outputs a memory address onto the internal address bus 101 and puts the data to be written onto the internal data bus 102. Then, during a period $t_2$–$t_3$, data is written to the internal memory 120 by outputting active level "0" to the internal DSTB signal line 104.

Figure 4B:
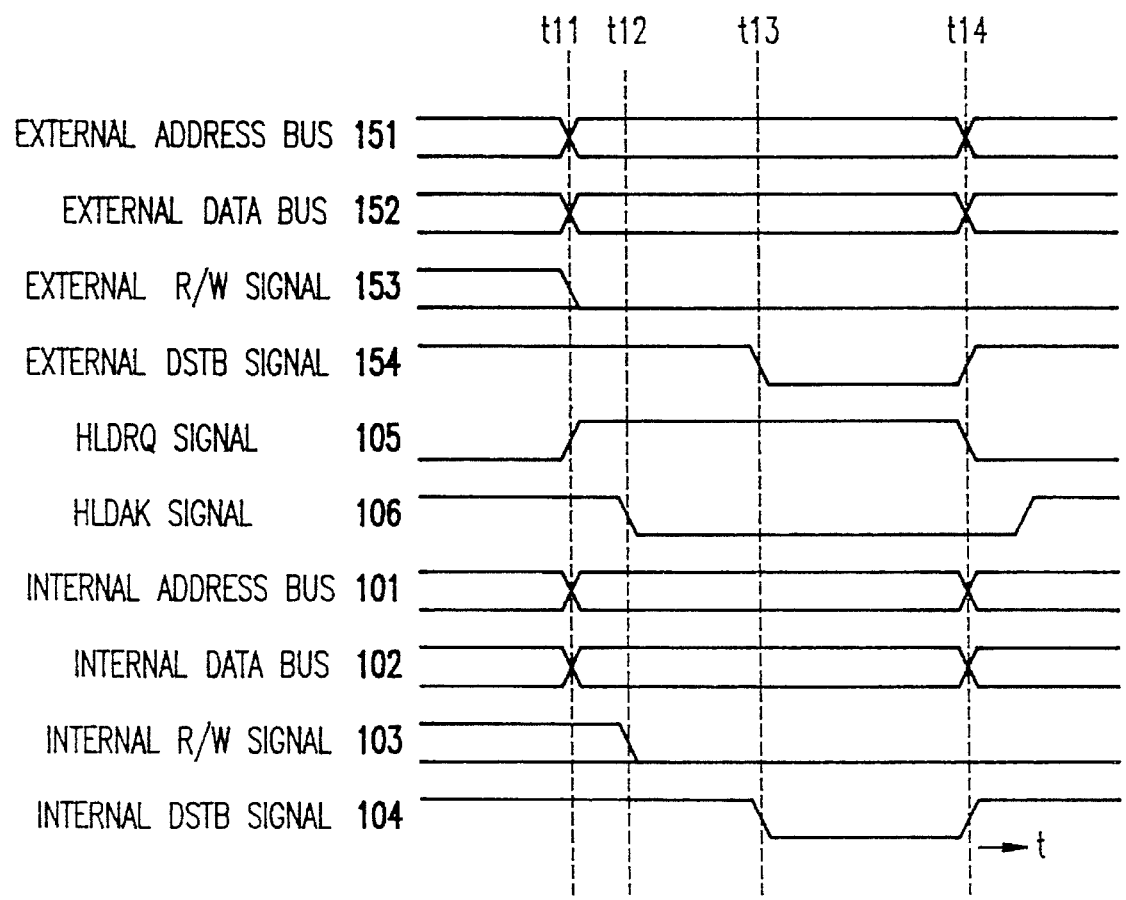

FIG. 4(b) shows signal timing when the microcomputer 150 writes data to the internal memory 120 within the microcomputer 100. The microcomputer 150 outputs "0" indicating write onto the external R/W signal line 153 at a time $t_{11}$. At time $t_{11}$, microcomputer 150 also outputs a memory address, corresponding to the internal memory 120, onto the external address bus 151 and provides data onto the external data bus 152. The address decoder 170 makes the HLDRQ signal on line 105 "1" since the address on the external address bus 151 refers to internal memory 120. At time $t_{12}$ the bus control portion 130 responds to the "1" of the HLDRQ signal on line 105 by making the HLDAK signal on line 106 a "0" and connecting the external bus and the internal bus. The bus control portion 130 also takes values from the external address bus 151, the external data bus 152, the external R/W signal line 153 and the external DSTB signal line 154, respectively, and outputs them to the internal address bus 101, the internal data bus 102, the internal R/W signal line 103 and the internal DSTB signal line 104. And, when the microcomputer 150 outputs active level "0" to the external DSTB signal line 154 during a period $t_{13}1$–$t_{14}$, the internal DSTB signal on line 104 becomes "0" and the data write operation of the microcomputer 150 to the internal memory 120 is completed.

Incidentally, where the bus control portion 130 outputs "0" as the HLDAK signal on line 106 and the CPU 110 attempts to access to the internal memory 120 when the internal bus and the external bus are connected, the CPU 110 waits for memory access until the HLDAK signal on line 106 becomes "1" and the internal bus is available.

Figure 5:
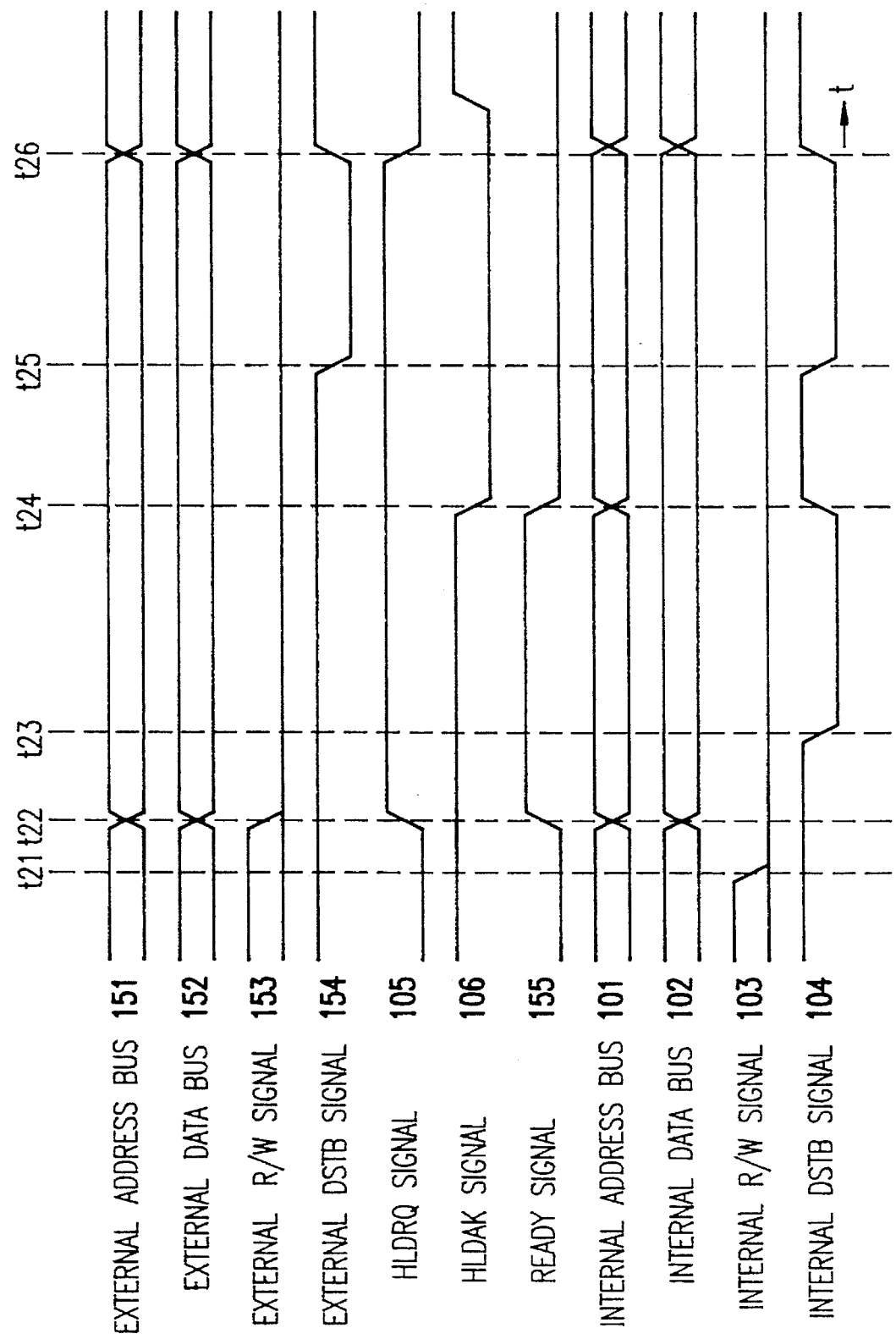
FIG. 5 is a timing chart explaining the operation of the embodiment of FIG. 3 when both the internal CPU of the first microcomputer and the external microcomputer write to the internal memory of the first microcomputer.

FIG. 5 shows a timing chart where the microcomputer 150 performs a write to the internal memory 120 while the CPU 110 is performing a write to the internal memory 120. At time $t_{21}$, CPU 110 outputs "0" to the internal R/W signal line 103, indicating a write operation. Also, at time $t_{21}$, CPU 110 outputs a memory address for the write operation onto the internal address bus 101 and puts data for the write operation onto the internal data bus 102. At a time $t_{22}$, while CPU 110 is performing the write operation to the internal memory 120, the microcomputer 150 starts a write to the internal memory 120 by outputting a "0" onto the external R/W signal line 153. At the same time $t_{22}$, microcomputer 150 outputs a memory address corresponding to the internal memory 120 onto external address bus 151 and puts data for the write operation onto the external data bus 151. The address decoder 170 makes the HLDRQ signal on line 105 "1" since the address on the external address bus 151 indicates the internal memory 120. The bus control portion 130 maintains the HLDAK signal on line 106 at "1" until the write operation by CPU 110 to the internal memory 120 is completed at time $t_{24}$. Therefore, the READY signal on line 155 remains "0" during the period $t_{22}$ to $t_{24}$ and the microcomputer 150 does not write to the memory until the READY signal on line 155 becomes "1", although the bus status remains as it is. Then, when the CPU 110 outputs an active level "0" to the internal DSTB signal line 104 during a period $t_{23}$–$t_{24}$, data is written in the internal memory 120, completing the data write operation from the CPU 110 to the internal memory 120. The bus control portion 130 then issues the HLDAK signal on line 106 "0" to connect the external bus and the internal bus. The bus control portion 130 takes values from the external address bus 151, the external data bus 152, the external R/W signal line 153 and the external DSTB signal line 154, and outputs them to the internal address bus 101, the internal data bus 102, the internal R/W signal line 103 and the internal DSTB signal line 104 respectively, at a time $t_{24}$, since the data write operation from the CPU 110 to the internal memory 120 is completed and the internal bus is not in use.

When the HLDAK signal on line 106 becomes "0", the READY signal on line 155 becomes "1" and the microcomputer 150 restarts memory write. When an active level "0" is outputted to the external DSTB signal line 154 during a period $t_{25}$–$t_{26}$, the internal DSTB signal on line 104 becomes "0", and the data write operation from the microcomputer 150 to the internal memory 120 is performed.

Since an operation for data read is the same as the data write operation described above except that the internal R/W signal on line 103 and the external R/W signal on line 153 become "1" and data flows on the internal data bus 102 and the external data bus 152 are opposite to those in the write operation, the description thereof is omitted. By using the microcomputers having the construction described above, it is possible to constitute a multi-processor microcomputer system capable of transferring data between a plurality of microcomputers through a memory internal to one of the microcomputers.

Figure 6:
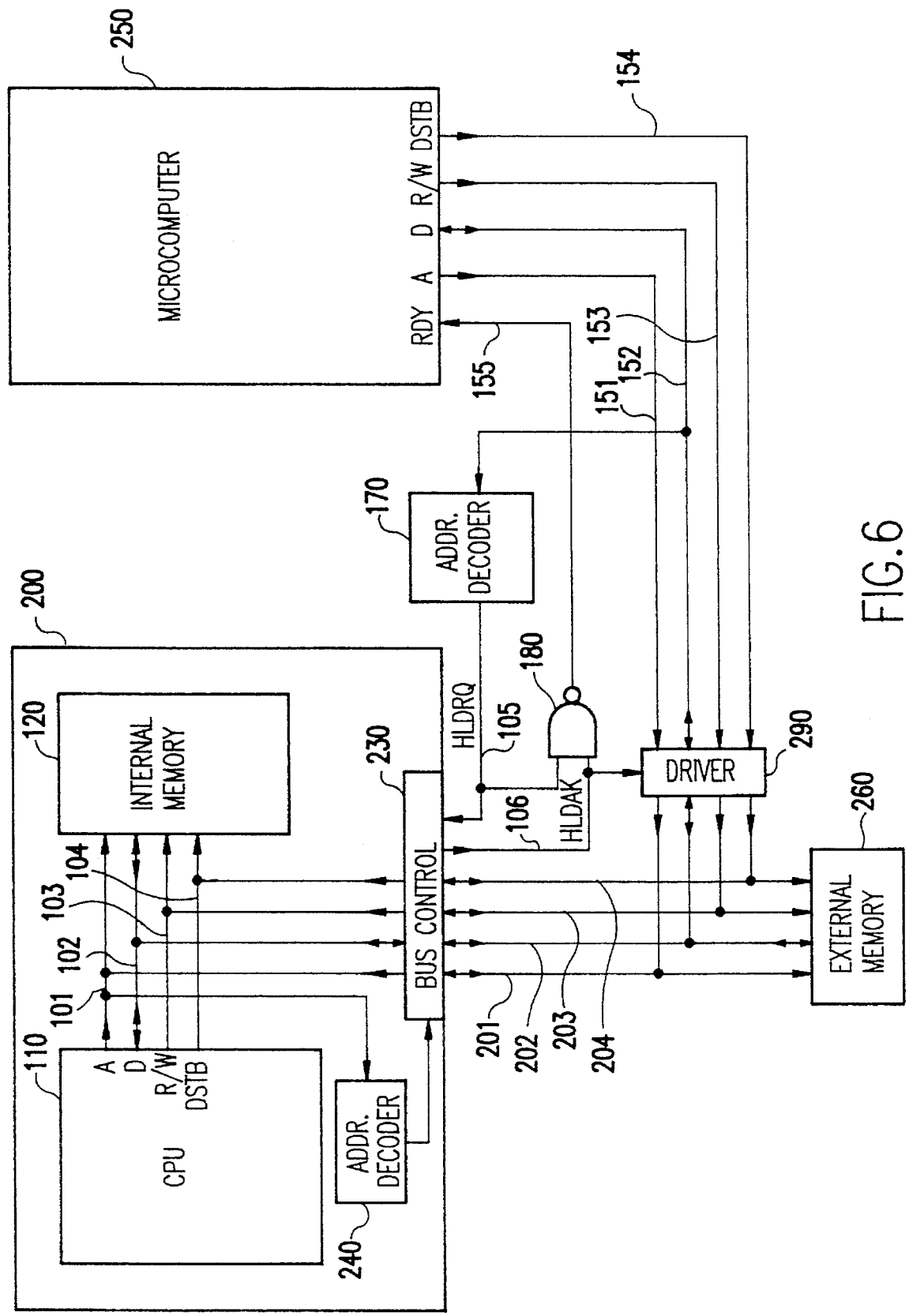
FIG. 6 is a block diagram of a microcomputer system in a second embodiment of the present invention.

FIG. 6 is a block diagram of a second embodiment of the present invention. This microcomputer system differs from the microcomputer system of the first embodiment in that, while, in the first embodiment, the microcomputer 100 can access only the internal memory, the microcomputer system of the second embodiment can access an external memory 260 as well. This microcomputer system comprises a microcomputer 200, a microcomputer 250, an external memory 260 for the microcomputer 200, an address decoder 170 and a bus driver 290.

Figure 1:
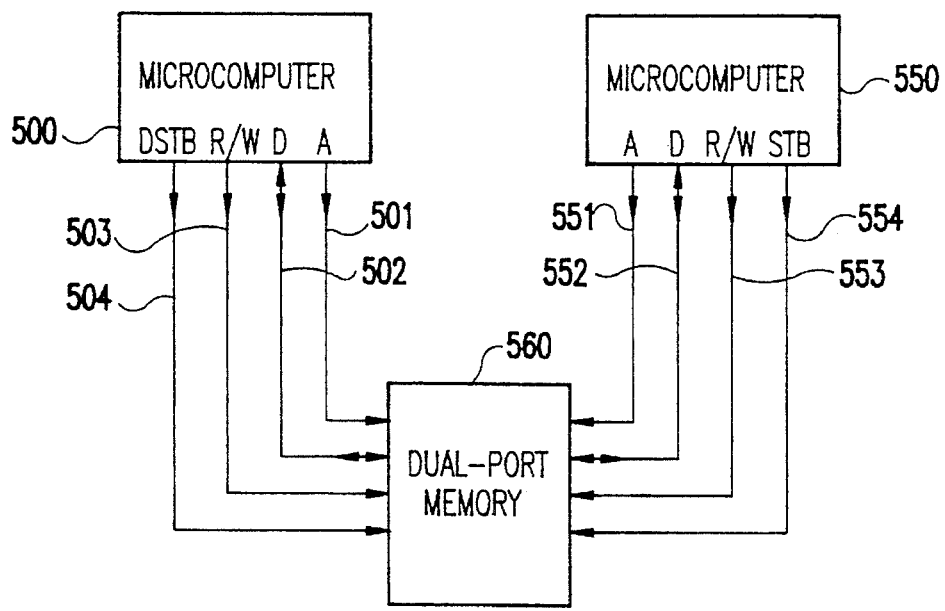
FIG. 1 is a block diagram of an example of a conventional microcomputer system.
Figure 2A:
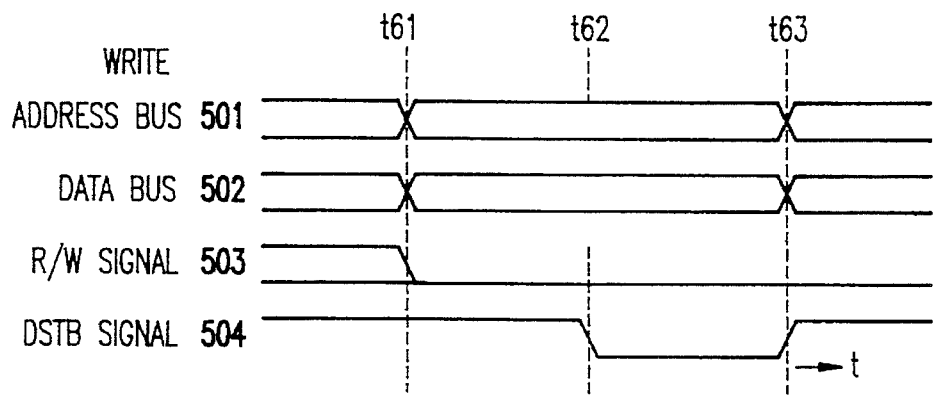
FIGS. 2(a) and 2(b) are respectively timing charts of write and read memory references in the microcomputer system in FIG. 1.
Figure 2B:
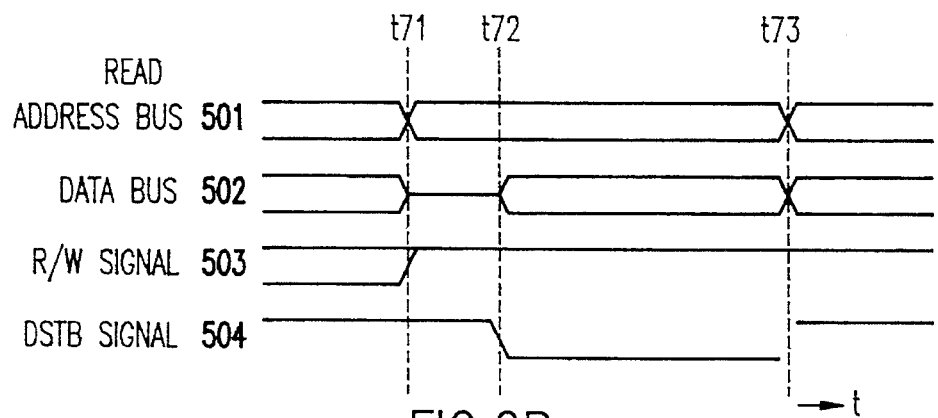

The microcomputer 200 has the same construction as that of the microcomputer 100 shown in FIG. 1 except it includes an internal address decoder 240 for determining whether a memory access from the CPU 110 is for an internal memory 120 or the external memory 260, and bus control portion 230 includes a function for outputting a value on the internal bus to the external bus when access from the CPU 110 is for the external memory 260.

The microcomputer 250 and the bus driver 290 are connected to each other by an external address bus 151 which outputs a reference address when the microcomputer 150 performs memory access, an external data bus 152 for transfer of data during memory access, an external R/W signal line 153 indicating whether the memory reference performed by the microcomputer 150 is write or read (by "0" when write and "1" when read), and an external DSTB signal line 154 for timing memory write/read. The microcomputer 200, the external memory 260 and the bus driver 290 are connected to each other by an external address bus 201 carrying a reference address for memory access, an external data bus 202 for transfer of data during memory access, an external R/W signal line 203 indicating whether a memory reference is write or read (by means of "0" when write and "1" when read), and an external DSTB signal line 204 for timing memory write or read.

The address decoder 170 outputs to the microcomputer 200 a HLDRQ "1" signal on line 105 when the address on the external address bus 151, which is outputted by the microcomputer 250, refers to the internal memory 120 within the microcomputer 200. The HLDRQ "1" signal on line 105 requests an external access to the internal memory 120 of microcomputer 200. The microcomputer 200 outputs a HLDAK signal on line 106 which becomes "0" when an access request by the HLDRQ signal 105 is accepted. The HLDRQ signal on line 105 and the HLDAK signal on line 106 are inputted to a NAND gate 180. The HLDAK signal on line 106 is also inputted to the bus driver 290. This bus driver 290 connects data on the bus 152 on the side of the microcomputer 250 to the bus 202 on the side of the microcomputer 200 when the HLDRQ signal on line 105 is "0" and outputs values on the external address bus 151, the external data bus 152, the external R/W signal on line 153 and the external DSTB signal on line 154, respectively, to the external address bus 201, the external data bus 202, the external R/W signal line 203 and the external DSTB signal line 204. Further, the NAND gate 180 outputs a READY signal on line 155 to the microcomputer 250 which, when the READY signal 155 becomes "0" during memory access, stops memory access of the microcomputer 250 until the READY signal on line 155 becomes "1".

Figure 7:
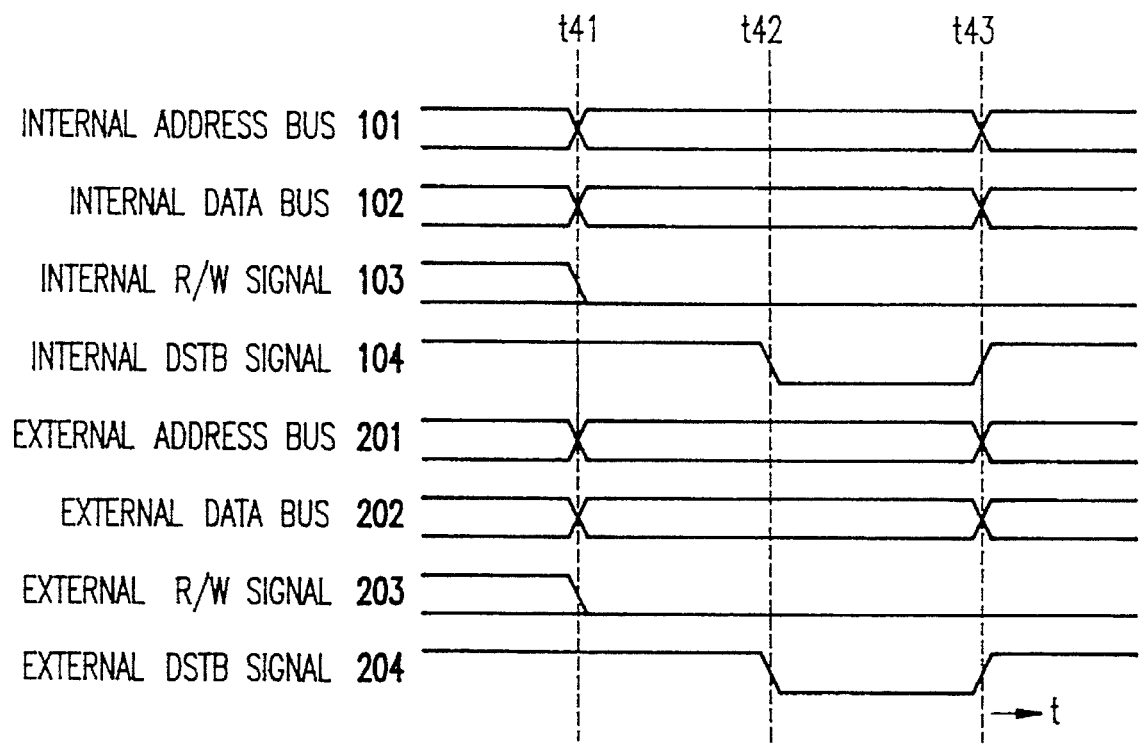
FIG. 7 is a timing chart of a write operation to an external memory of the embodiment of FIG. 6 by the internal CPU of the first microcomputer.

An operation of this microcomputer system will be described with reference to timing charts in FIGS. 7 and 8. FIG. 7 is the timing chart when the CPU 110 performs data write for the external memory 260. The CPU 110 outputs "0" indicative of write to the internal R/W signal line 103 at a time $t_{41}$, and outputs a) a memory address which corresponds to the external memory 260 to be written onto the internal 30 address bus 101 and b) data to be written onto the internal data bus 102. The internal address decoder 240 determines that the address on the internal address bus is an access to the external memory 260. The bus control portion 230 outputs values on the internal address bus 101, the internal data bus 102, the internal R/W signal line 103 and the internal DSTB signal line 104, respectively, to the external address bus 201, the external data bus 202, the external R/W signal line 203 and the external DSTB signal line 204. Then, during a period $t_{42}$–$t_{43}$, when an active level "0" is outputted on the internal DSTB signal line 104, "0" is outputted to the external DSTB signal line 204, performing dam write to the external memory 260.

Figure 8:
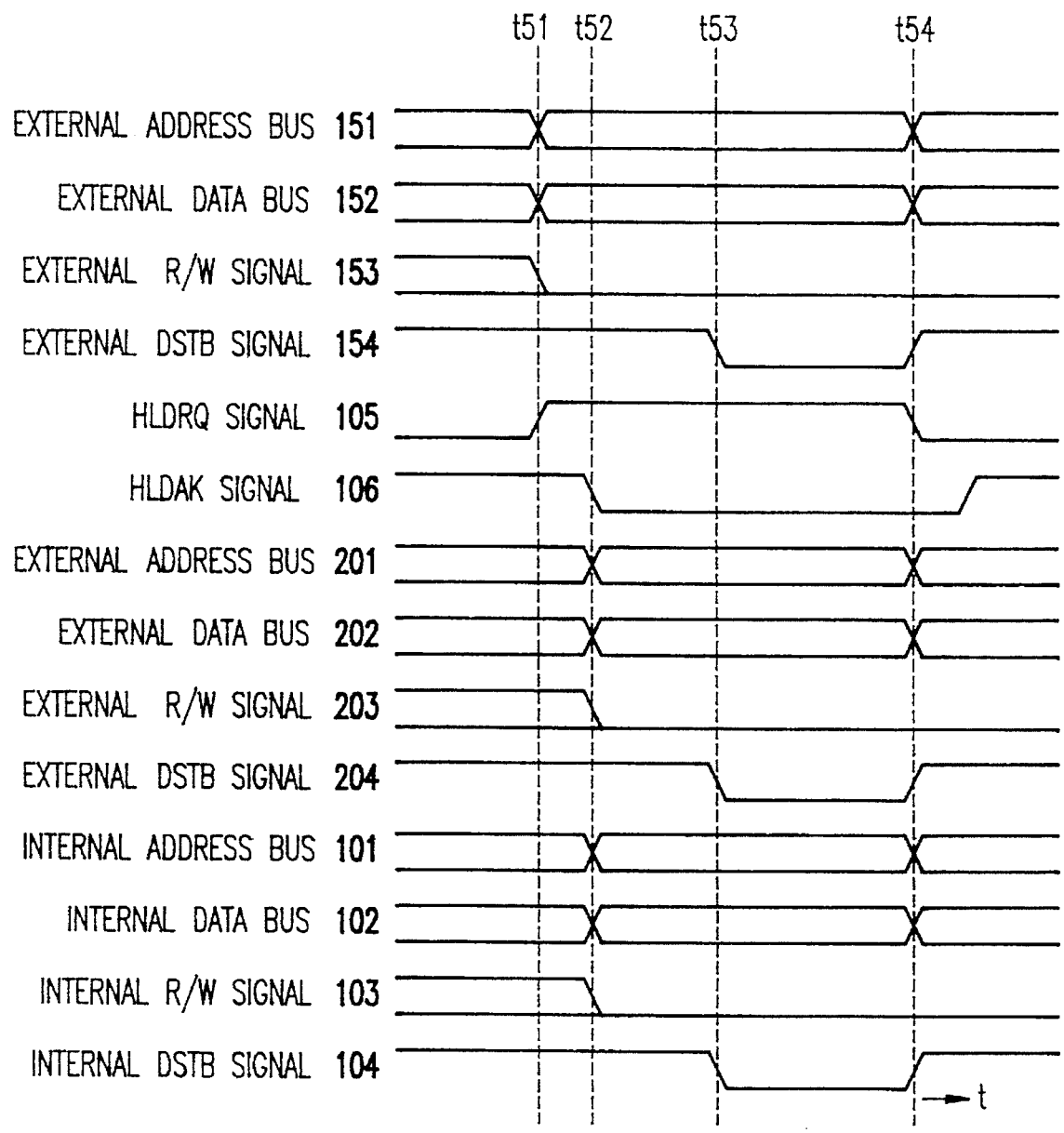
FIG. 8 is a timing chart explaining the operation of the embodiment of FIG. 6 when the external microcomputer performs a data write to the internal memory of the first microcomputer.

FIG. 8 is a timing chart when the microcomputer 250 performs data write to the internal memory 120 within the microcomputer 200. At a time $t_{51}$, the microcomputer 250 outputs "0" to the external R/W signal line $t_{53}$, indicating a memory write operation. At time $t_{51}$, microcomputer 250 also outputs a) a memory address corresponding to the internal memory 120 onto the external address bus 151 and b) write data onto the external data bus 152. The address decoder 170 makes the HLDRQ signal on line 105 "1" since the address on the external address bus 151 refers to the internal memory 120.

The bus control portion 130 responds to a signal level of "1" on HLDRQ line 105 to make the HLDAK signal on line 106 a "0" level and connect the external bus and the internal bus. The bus control portion 130 also outputs values on the external address bus 201, the external data bus 202, the external R/W signal line 203 and the external DSTB signal line 204, respectively, to the internal address bus 101, the internal data bus 102, the internal R/W signal line 103 and the internal DSTB signal line 104 at a time $t_{52}$. Since the HLDAK signal on line 106 is "0", the bus driver 290 outputs values on the external address bus 151, the external data bus 152, the external R/W signal line 153 and the external DSTB signal line 154, respectively, to the external address bus 201, the external data bus 202, the external R/W signal line 203 and the external DSTB signal line 204.

As a result, the value on the external bus 152 on the side of the microcomputer 150 is outputted onto the internal bus 102 within the microcomputer 200 and, when the microcomputer 250 outputs an active level "0" to the external DSTB signal line 154 during a period $t_{53}$–$t_{54}$, the internal DSTB signal on line 104 becomes "0", causing a data write from the microcomputer 150 to the internal memory 120.

An operation in a case where the CPU 110 of the microcomputer 200 performs an access to data on the internal memory 120 at the same time that there is an access from the microcomputer 250 to the internal memory 120 is the same as that of the first embodiment except that an operation of the bus driver 290 described with reference to FIG. 8 is included. According to the microcomputer system of this embodiment, the microcomputer 200 can access the external memory without increasing the number of terminals on the microcomputer 200, compared with the microcomputer system of the first embodiment.

Figure 9:
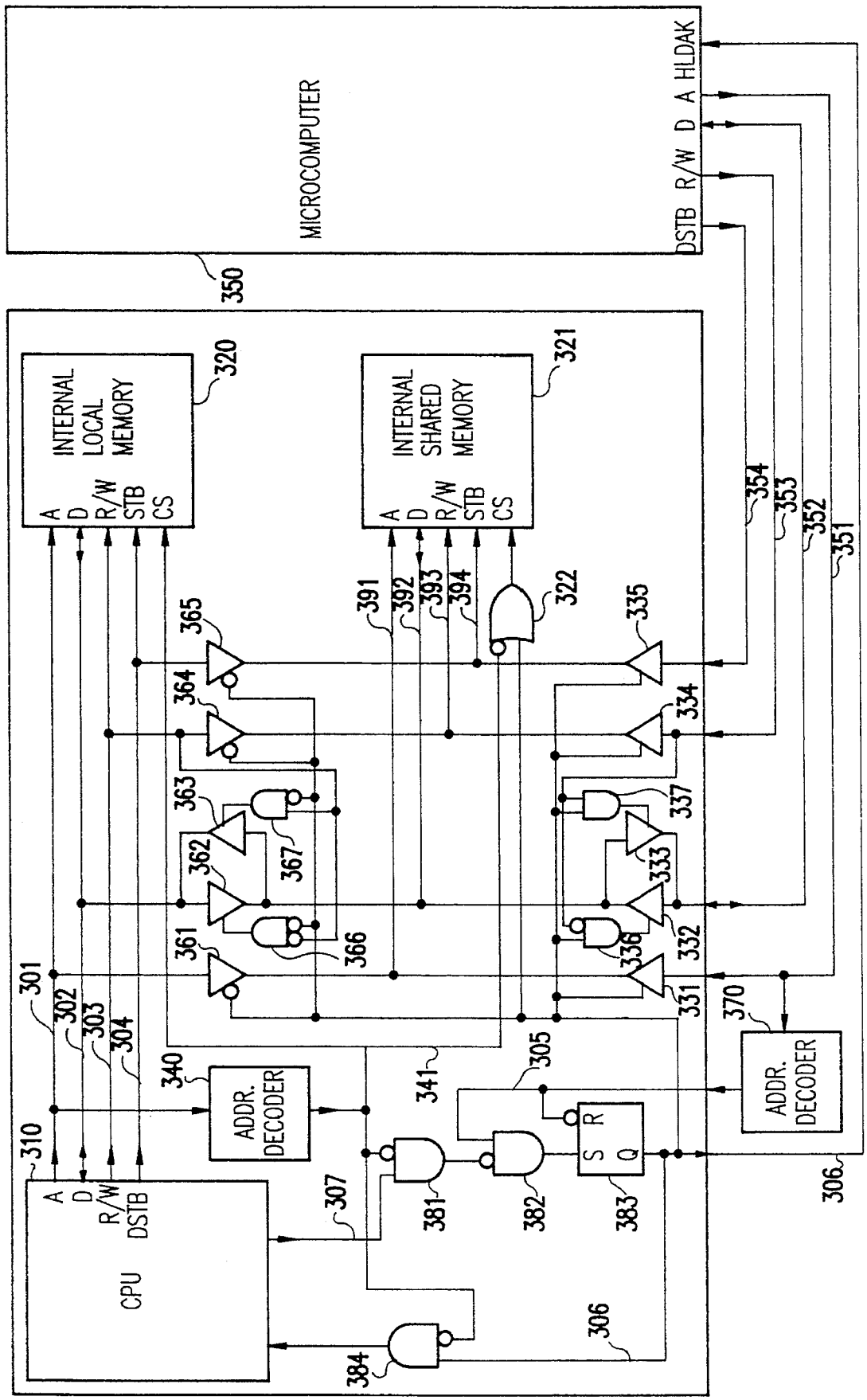
FIG. 9 is a block diagram of a microcomputer system in a third embodiment of the present invention.

FIG. 9 is a block diagram of a multi-processor microcomputer system according to a third embodiment of the present invention, in which a memory within a microcomputer is divided into two portions, one being only accessible by an internal CPU and the other being accessible by the internal CPU and externally as well. This multi-processor microcomputer system comprises a microcomputer 300, a microcomputer 350 and an address decoder 370. The microcomputer 300 and the microcomputer 350 are connected to each other by a) an external address bus 351 for outputting a reference address when the microcomputer 350 references the memory, b) an external data bus 352 for transfer of data during the memory access, c) an external R/W signal line 353 for indicating whether the memory reference performed by the microcomputer 350 is either read ("1" signal level) or write ("0" signal level), and d) an external DSTB signal line 354 and HLDAK signal line 306 for timing write/read for the memory. The microcomputer 350 stops a memory reference when the HLDAK signal on line 306 becomes "0" during memory reference, and does not continue its memory access until the HLDAK signal on line 306 becomes "1". The address decoder 370 outputs the HLDRQ signal on line 305 to the microcomputer 300, which signal is "1" when the address on the external address bus 351 (outputted by the microcomputer 350) refers to internal shared memory 321 of the microcomputer 300. This condition of the HLDRQ signal received by the microcomputer 300 alerts the microcomputer 300 to externally request a reference to the internal shared memory 321.

The microcomputer 300 comprises a CPU 3 10, an internal local memory 320 (for write/read access by CPU 310), an internal shared memory 321 (for write/read access by both CPU 310 and the microcomputer 350) and an internal address decoder 340. The CPU 3 10 outputs a) a reference address to first internal address bus 301 when the CPU 310 performs a memory reference, b) dam to a first internal dam bus 302 for data transfer during memory reference, c) a first internal R/W signal on line 303 which indicates whether the memory reference performed by the CPU 310 is write ("0" signal level) or read ("1" signal level), d) a first internal DSTB signal on line 304 timing write/read with respect to the performance of the memory reference, and e) a CPU memory reference signal on line 307 which is "1" when the CPU 310 performs a memory reference.

From the perspective of internal local memory 320, the first internal address bus 301, the first internal dam bus 302, the first internal R/W signal line 303, the first internal DSTB signal line 304 and the CPU memory reference signal line 307 are connected to this memory. The internal local memory 320 writes dam on the first internal data bus 302 at the address specified on the first internal address bus 301 when the first internal R/W signal on line 303 is "0", the CPU memory reference signal on line 307 is "1" and the first internal DSTB signal on line 304 is "0". Internal local memory 320 reads data from the address specified on the first internal address bus 301 and outputs it on the first internal data bus 302 when the first internal R/W signal on line 303 is "1".

From the perspective of internal shared memory 321, a second internal address bus 391, a second internal data bus 392, a second internal R/W signal line 393, a second internal DSTB signal line 394 and an output of an OR gate 322 are connected to this memory. The internal shared memory 321 writes data on the second internal data bus 392 at the address specified on the second internal address bus 391 when the second internal R/W signal on line 393 is "0", the output of the OR gate 322 is "1" and the second internal DSTB signal on line 394 is "0". Under the same conditions, but where the second internal R/W signal on line 393 is "1", the internal shared memory 321 reads data from the address specified on the second internal address bus and outputs it on the second internal data bus 392.

The internal address decoder 340 decodes an address on the first internal address bus 301 outputted by the CPU 310 and outputs "1" to the internal local reference signal line 341 when the memory reference from the CPU 3 10 indicates the internal local memory 320 and outputs "0" to the internal local reference signal line 341 otherwise. An inverted logic signal of the internal local memory reference signal line 341 and a CPU memory reference signal 307 (which is "1" when the CPU 310 performs in memory reference) are inputted to an AND gate 381. An inverted logic signal of this output from the AND gate 381 and the HLDRQ signal on line 305 are inputted to an AND gate 382. An output of the AND gate 382 is inputted to a set side of a set-reset flip-flop (referred to as SR-FF hereinafter) 383 and the inverted logic signal of the signal on HLDRQ signal line 305 is inputted to a reset side of the SR-FF 383. The SR-FF 383 makes its output HLDAK signal on line 306 "1" when the output of the AND gate 382 is "1", its output HLDAK signal on line 306 "0" when the output of the AND gate 382 is "0", and holds a current output value when the output of the AND gate 382 is "0" and the HLDRQ signal on line 305 is "1". The HLDAK signal on line 306 (which is the output of the SR-FF 383) and an inverted signal of the internal local memory reference signal 341 are inputted to an AND gate 384, and an output of the AND gate 384 is inputted to the CPU 310. The CPU 310 stops memory reference when the output of the AND gate 384 becomes "1" during memory reference, and does not resume memory reference until the output of the AND gate 384 becomes "1". Further, an inverted logic signal of the HLDAK signal on line 306 is inputted to three-state bus drivers 361, 364 and 365 as control signals. When the HLDAK signal on line 306 is "0", the bus drivers 361, 364 and 365 output values which are on the first internal address bus 301, the first internal R/W signal line 303 and the first internal DSTB signal line 304, respectively, to the second internal address bus 391, the second internal R/W signal line 393 and the second internal DSTB signal line 394.

An inverted logic signal of the HLDAK signal on line 306 and an inverted logic signal of the internal R/W signal on line 303 are inputted to an AND gate 366, and an inverted logic signal of the HLDAK signal on line 306 and the internal R/W signal on line 303 are inputted to an AND gate 367. Outputs of the AND gate 366 and the AND gate 367 are inputted as control signals to the respective bus drivers 362 and 363. And, when the output of the AND gate 366 is "1", the bus driver 362 outputs a value which is on the first internal data bus 302 to the second internal data bus 392. When the output of the AND gate 367 is "1", the bus driver 363 outputs a value which is on the second internal data bus 392 to the second internal data bus 302. Further, the HLDAK signal on line 306 is inputted as control signal for the bus drivers 331, 334 and 335 and, when the HLDAK signal on line 306 is "1", the respective bus drivers 331, 334 and 335 output values which are on the external address bus 351, the external R/W signal line 353 and the external DSTB signal line 354, respectively, to the second internal address bus 391, the second internal R/W signal line 393 and the second internal DSTB signal line 394.

The HLDAK signal on line 306 and an inverted logic signal of the external R/W signal 353 are inputted to an AND gate 336, and the HLDAK signal on line 306 and the external R/W signal on line 353 are inputted to an AND gate 337. Outputs of the AND gate 336 and the AND gate 337 are inputted as control signals for the respective bus drivers 332 and 333. And, when the output of the AND gate 336 is "1", the bus driver 332 outputs a value which is on the external dam bus 352 to the second internal data bus 392. When the output of the AND gate 337 is "1", the bus driver 333 outputs a value which is on the second internal data bus 392 to the external data bus 352. The HLDAK signal on line 306 and an inverted logic signal of the internal local memory reference signal on line 341 are inputted to an OR gate 322.

Figure 10A:
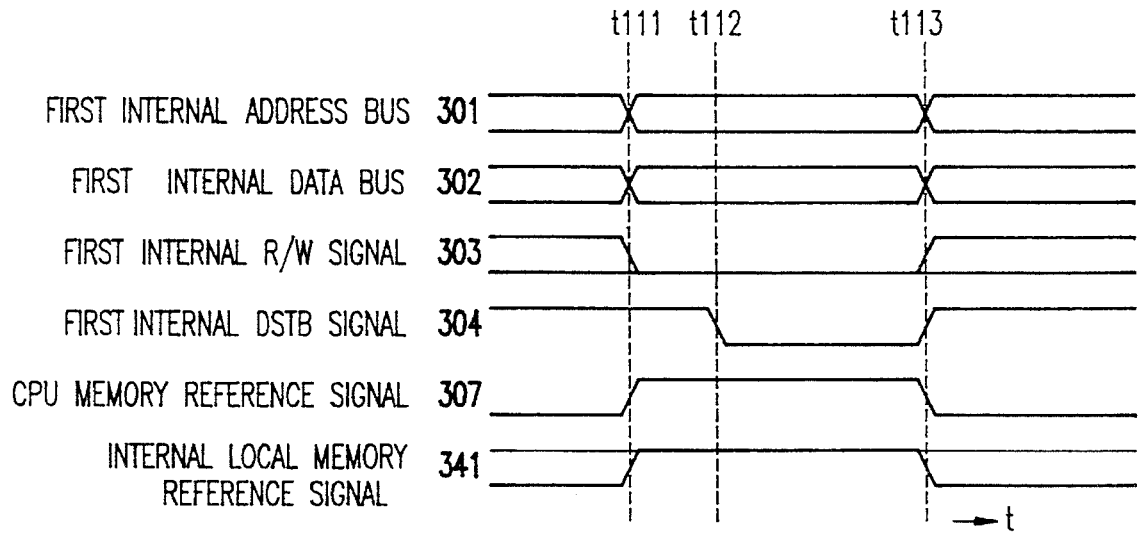
FIGS. 10(a) and 10(b) are timing charts of a memory reference operation in the microcomputer system in FIG. 9 respectively for the cases where the internal CPU of the first microcomputer performs a data write and data read to the internal local memory of the first microcomputer.

The operation of the multi-processor microcomputer system of the third embodiment will now be described with reference to timing charts in FIGS. 10 to 15. FIG. 10(a) is a timing chart for the case where the CPU 3 10 performs a data write to the internal local memory 320. The CPU 310 outputs "0" to the first internal R/W signal line 303, indicating a memory write operation, at time $t_{111}$. Also at time $t_{111}$, CPU 310 outputs a) the address of internal local memory 320 to which the memory write is performed on the first internal address bus 301 and b) data to be written on the first internal data bus 302. The internal address decoder 340 outputs "1" to the internal local memory reference signal line 341 since the address on the first internal address bus 301 refers to the internal local memory 320. Then, during a period $t_{112}$–$t_{113}$, when the CPU 310 outputs an active level "0" to the first internal DSTB signal line 304, data is written to the internal local memory 120 performs a dam write operation on an address which is on the first internal address bus 301.

Figure 10B:
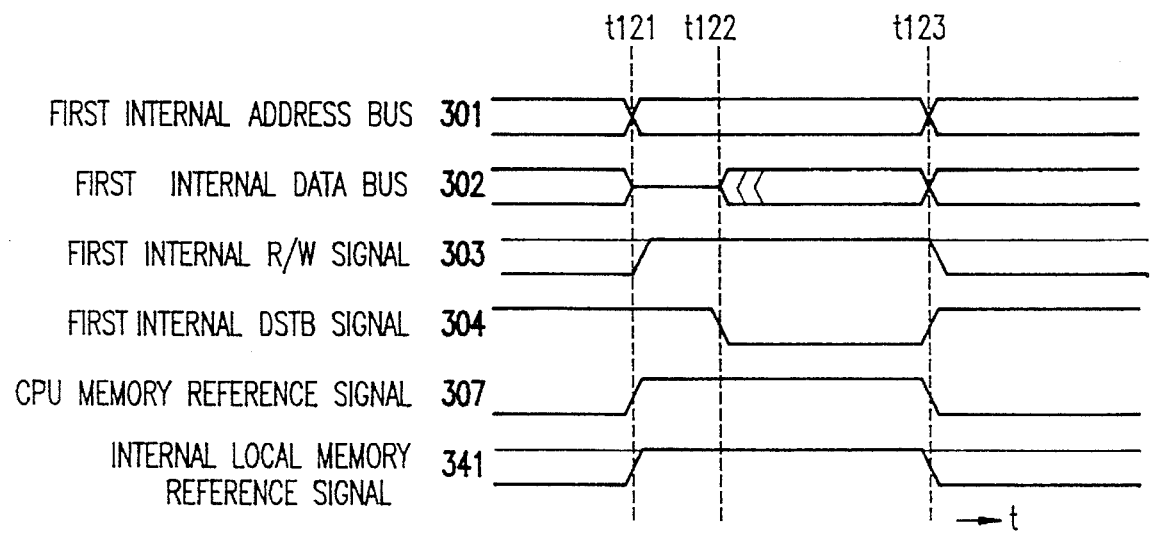

FIG. 10(b) is a timing chart when the CPU 310 performs a data read with respect to the internal local memory 320. The CPU 3 10 a) outputs "1" (indicating a read operation) to the first internal R/W signal line 303, b) puts the address of the internal local memory 320 from which a read is to be performed onto the first internal address bus 301, and c) places the first internal data bus 302 into a high impedance state. The internal address decoder 340 outputs "1" to the internal local memory reference signal line 341 since the address on the first internal address bus 301 refers to the internal local memory 320. Then, during a period $t_{122}$–$t_{123}$, when the CPU 310 outputs an active level "0" to the first internal DSTB signal line 304, the internal local memory 120 reads data from the address referred to by the first internal address bus 301 and outputs it to the first internal data bus 302.

Figure 11:
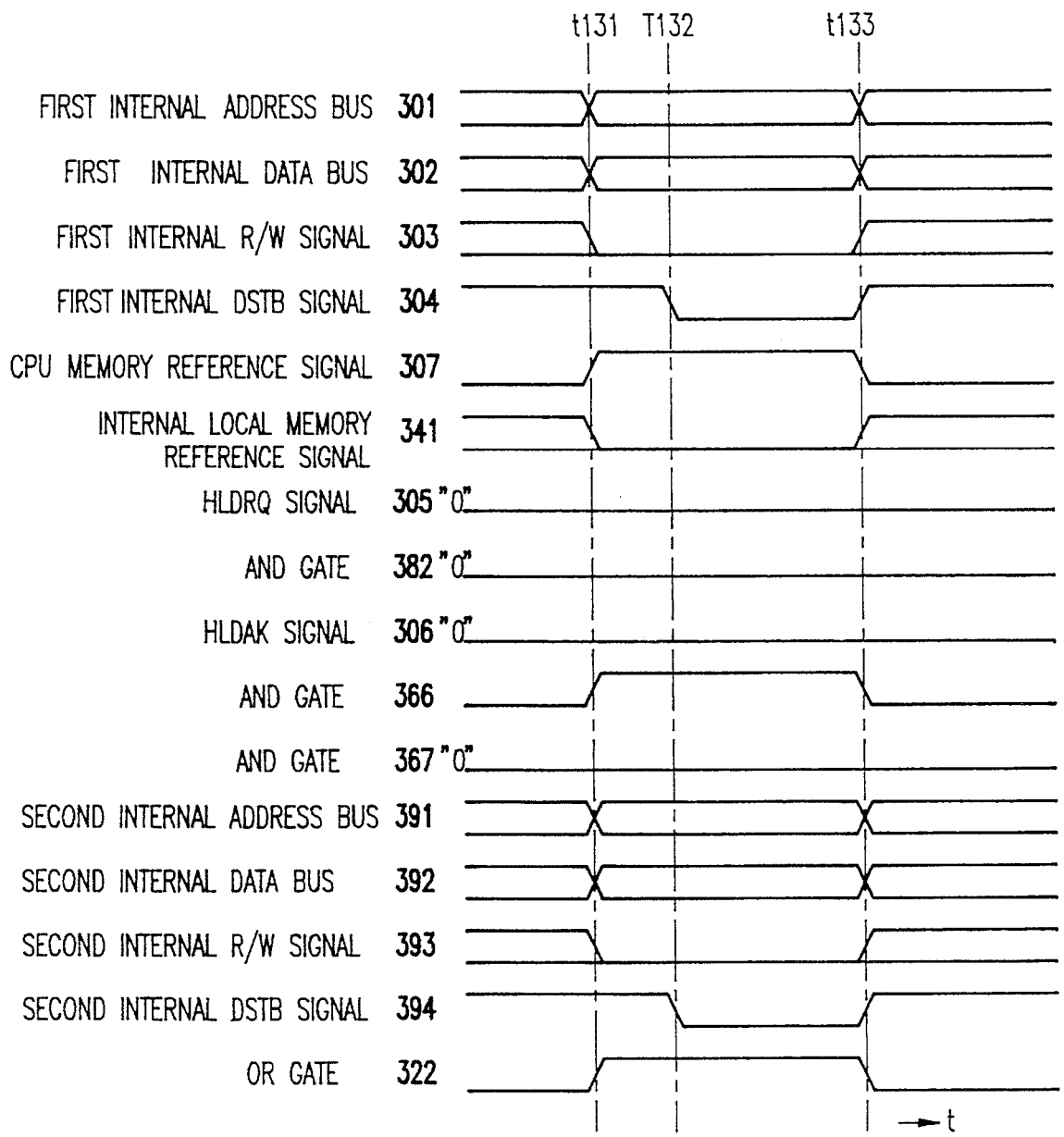
FIG. 11 is a timing chart explaining the operation of the embodiment of FIG. 9 when the internal CPU of the first microcomputer performs a data write to the internal shared memory of the first microcomputer.

FIG. 11 is a timing chart when the CPU 310 performs a data write to the internal shared memory 321. In this case, it is assumed that the microcomputer 350 does not perform memory reference with respect to the internal shared memory 321 and the HLDRQ signal on line 305 is "0". The SR-FF 383 outputs "0" to the HLDAK signal line 306 since the HLDRQ signal on line 305 is "0". Since the HLDAK signal on line 306 is "0", the bus drivers 361, 364 and 365 output values which are on the first internal address bus 301, the first internal R/W signal line 303 and the first internal DSTB signal line 304, respectively, to the second internal address bus 391, the second internal R/W signal line 393 and the second internal DSTB signal line 394. Since for the bus drivers 331, 332, 333, 334, and 335 the HLDAK signal on line 306 is "0" and the AND gates 336 and 337 also output "0", the external signal is separated from the second internal signal. At a time $t_{131}$, CPU 310 a) outputs "0" (indicating a write operation) to the first internal R/W signal line 303, b) puts the address of the internal local memory 320 to which a write is to be performed onto the first internal address bus 301, c) outputs dam to be written onto the first internal data bus 302, and d) outputs "1" to the CPU memory reference signal line 307. The internal address decoder 340 outputs "0" to the internal local memory reference signal line 341 since the address on the first internal address bus 301 (outputted at time $t_{131}$) refers to the internal shared memory 321, and, as a result, the AND gate 366 outputs "1" and the AND gate 367 outputs "0". Since the output of the AND gate 366 is "1", the bus driver 362 outputs a value which is on the first internal data bus 302 to the second internal data bus 392. Further, the OR gate 322 outputs "1" since the internal local memory reference signal 341 is "0". Then, during a period $t_{132}$–$t_{133}$, when the CPU 310 outputs an active level "0" to the first internal DSTB signal line 304, a "0" is outputted to the second internal DSTB signal line 394, and the internal shared memory 321 writes data which is on the second internal data bus 392 into an address referred to by the second internal address bus 39 I, thus performing a write to the internal shared memory 321.

When the CPU 310 reads data from the internal shared memory 321, the operation is the same as that of write except that the first internal R/W signal on line 303 becomes "1", the AND gate 367 (instead of AND gate 366) outputs "1", and the bus driver 363 (instead of the bus driver 362) outputs data which is on the second internal data bus 392 to the first data bus 302 (rather than outputting the value on the first internal data bus 302 to the second internal data bus 392).

Figure 12:
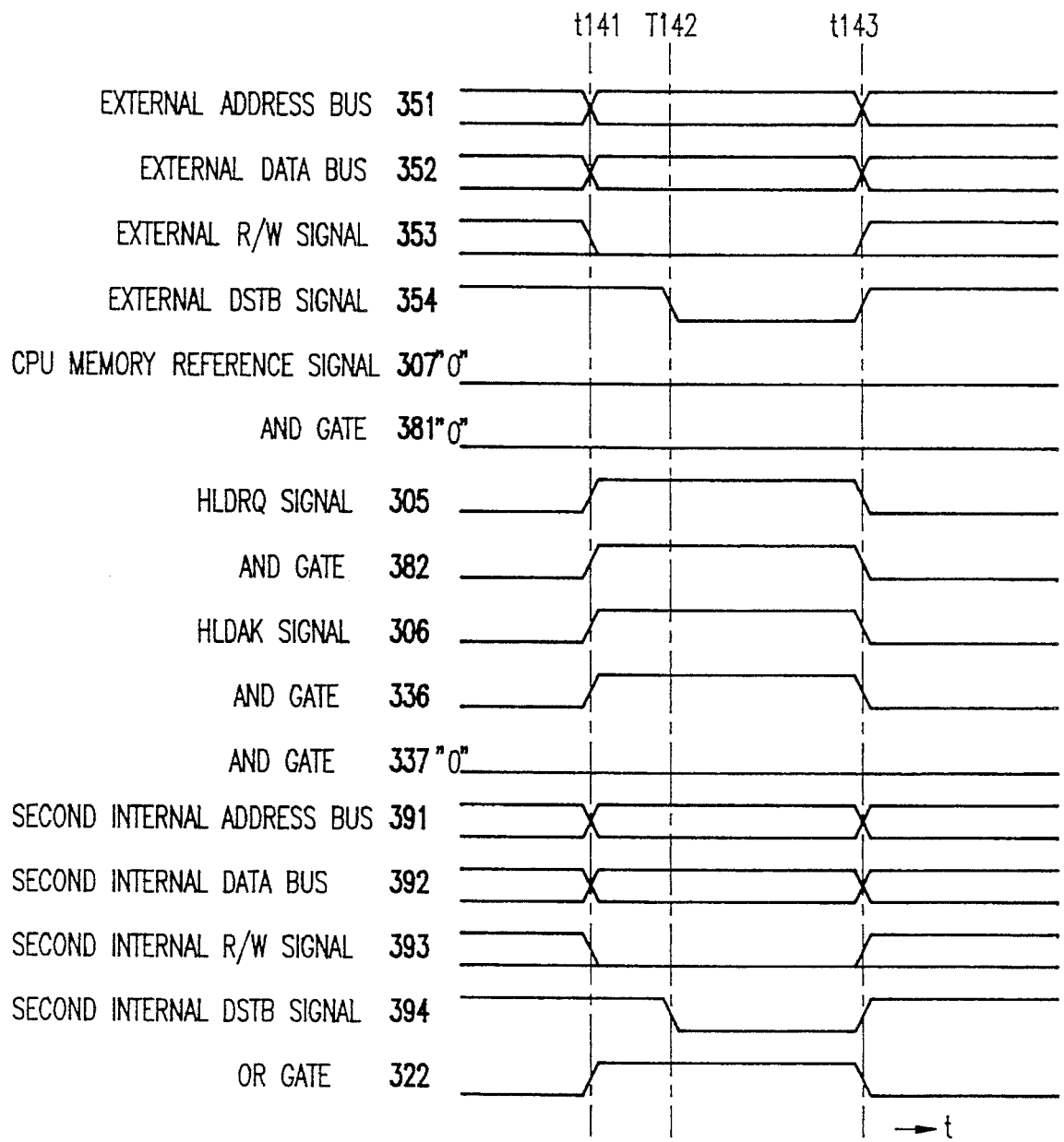
FIG. 12 is a timing chart explaining the operation of the embodiment of FIG. 9 when the external microcomputer performs a data write to the internal shared memory of the first microcomputer.

FIG. 12 is a timing chart for the case when the microcomputer 350 performs a data write operation to the internal shared memory 321. In this case, it is assumed that the CPU 3 10 does not perform memory reference and the CPU memory reference signal 307 is "0". The microcomputer 350 a) outputs "0" (indicating a write operation) to the external R/W signal line 353, b) puts a memory address corresponding to the internal shared memory 32 1 onto the external address bus 35 1, and c) outputs data to be written to the external address bus 352. The address decoder 370 makes the HLDRQ signal on line 305 "1" since the address on the external address bus 351 refers to the internal shared memory 321. Since the CPU memory reference signal on line 307 is "0", the output of the AND gate 381 is "0". Since the HLDRQ signal on line 305 is "1", the AND gate 382 outputs "1" and the SR-FF 383 outputs "1" to the HLDAK signal line 306. Since the HLDAK signal is "1", the bus drivers 331,334 and 335 output values which are on the external address bus 351, the external R/W signal line 353, the external DSTB signal line 354, respectively, to the second internal address bus 391, the second internal R/W signal line 393 and the second internal DSTB signal line 394. Since, in the bus drivers 361,362, 363,364 and 365, the HLDAK signal 306 is "1" and the AND gates 366 and 367 output "0", the first internal signal is separated from the second internal signal. Since the external R/W signal on line 353 is "0", the AND gate 336 outputs "1" and the AND gate 337 outputs "0". Since the output of the AND gate 336 is "1", the bus driver 332 outputs a value which is on the external data bus 302 to the second internal data bus 392. Further, since the HLDAK signal 306 is "1", the OR gate 322 outputs "1" Then, during a period $t_{142}$–$t_{143}$, when the microcomputer 350 outputs an active level "0" to the external DSTB signal line 354, "0" is outputted to the second internal DSTB signal line 394 and the internal shared memory 321 writes data which is on the second internal data bus 392 into the address referred to by the second internal address bus 39 1.

When a data write from the microcomputer 350 to the internal shared memory 321 completes at a time $t_{143}$, the external address decoder 370 outputs "0" to the HLDRQ signal line 305, since the microcomputer 350 outputs to the address bus 351 an address which does not reference the internal shared memory 321. The SR-FF 383 outputs "0" to the HLDAK signal line 306 since the HLDRQ signal becomes "0". Accordingly, the write operation from the microcomputer 350 to the internal shared memory 321 is completed. When the microcomputer 350 reads data from the internal shared memory 321, the operation is the same as the write operation except that a) the external R/W signal on line 353 becomes "1", b) the AND gate 337 (rather than the AND gate 336) outputs "1", and c) the bus driver 333 outputs dam which is on the second internal data bus 392 to the external data bus 352 (rather than the bus driver 332 outputting the value which is on the external data bus 352 to the second internal data bus 392).

Figure 13:
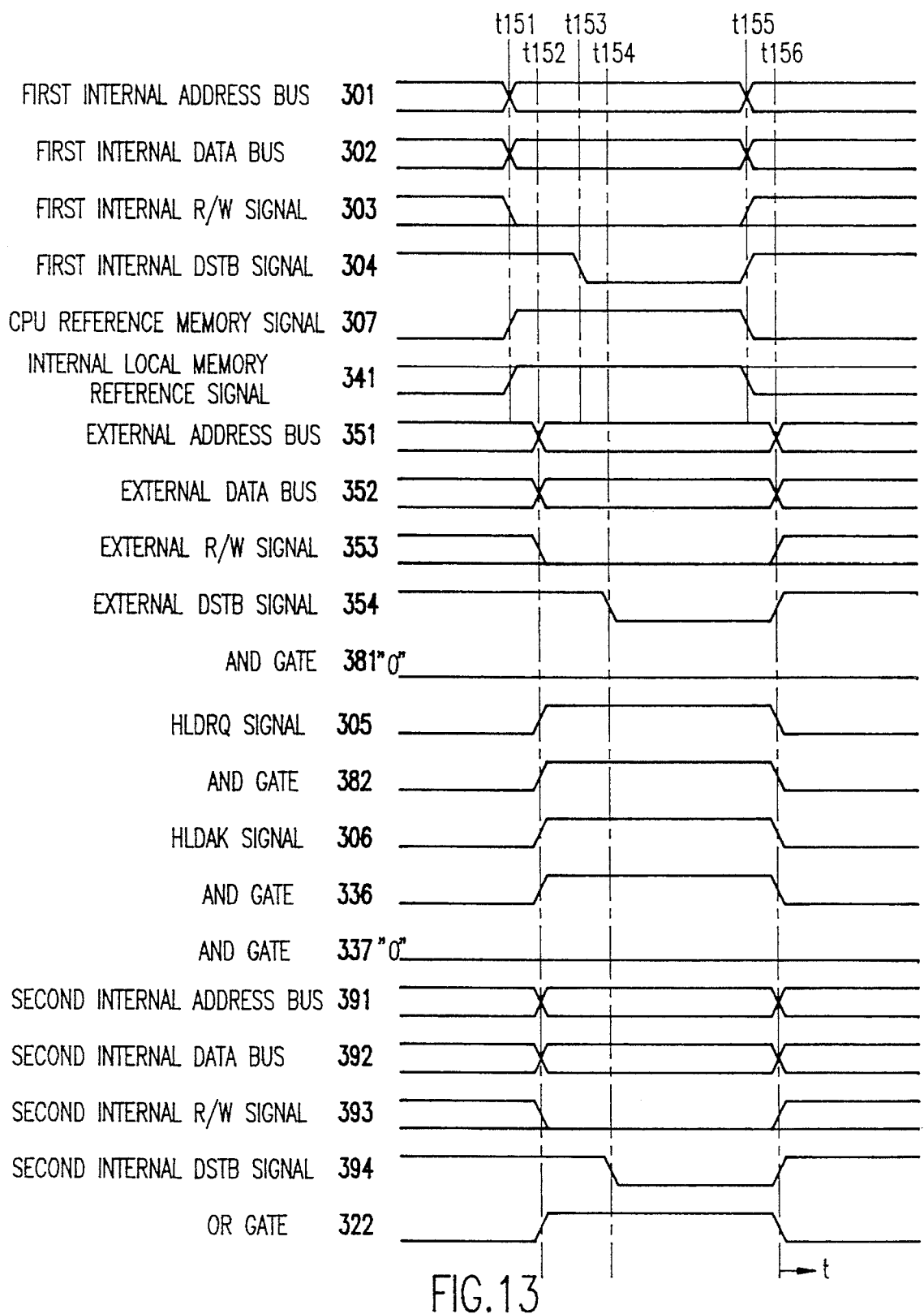
FIG. 13 is a timing chart explaining the operation of the embodiment of FIG. 9 when the external microcomputer references the internal shared memory of the first microcomputer while the internal CPU of the first microcomputer is writing data in the internal local memory of the first microcomputer.

FIG. 13 is a timing chart for the case where the microcomputer 350 references the internal shared memory 321 while the CPU 310 is writing data in the internal local memory 320. At a time $t_{151}$, CPU 310 outputs "0" (indicating a write operation) to the first internal R/W signal line 303, and also a) outputs an address of the internal local memory 320 to the first internal address bus 301, b) places data on the first internal data bus 302, and c) outputs a "1" to the CPU memory reference signal line 307. Since the address on the first internal address bus 301 refers to the internal local memory 320, the internal address decoder 340 outputs "1" to the internal local memory reference signal line 34 I. Then, at a time $t_{152}$, the microcomputer 350 starts a data write to the internal shared memory 321. Specifically, microcomputer 350 a) outputs a "0" (indicating a write operation) to the external R/W signal line 353, b) puts a memory address corresponding to the internal shared memory 321 onto the external address bus 351, and c) places the data to be written onto the external data bus 352. Since the address on the external address bus 351 refers to the internal shared memory 321, the address decoder 370 makes the HLDRQ signal on line 305 a "1". Since the internal local memory reference signal on line 341 is "1", the AND gate 381 outputs a "0". Since the AND gate 381 outputs "0" and the HLDRQ signal on line 305 is "1", the AND gate 382 outputs "1" and the SR-FF 383 outputs "1" to the HLDAK signal line 306. When the HLDAK signal on line 306 becomes "1", the bus drivers 331, 334 and 335 output values which are on the external address bus 351, the external R/W signal line 353 and the external DSTB signal line 354, respectively, to the second internal address bus 391, the second internal R/W signal line 393 and the second internal DSTB signal line 394.

Since, in the bus drivers 361,362, 363, 364 and 365, the HLDAK signal on line 306 is "1" and the AND gates 366 and 367 output "0s", the first internal signal is separated from the second internal signal. Further, since the external R/W signal on line 353 is "0", the AND gate 336 outputs a "1" and the AND gate 337 outputs a "0". Since the AND gate 336 outputs a "1", the bus driver 332 outputs a value which is on the external data bus 352 to the second internal data bus 392. Further, since the HLDAK signal on line 306 is "1", the OR gate 322 outputs "1" During a period $t_{153}$–$t_{155}$, when the CPU 310 outputs an active level "0" to the first internal DSTB signal line 304, the internal local memory 120 performs a data write to an address referred to by the first internal address bus 301. Then, in a period $t_{154}$–$t_{156}$, when the microcomputer 350 outputs an active level "0" to the external DSTB signal line 354, a "0" is outputted to the second internal DSTB signal line 394 and the internal shared memory 321 writes data which is on the second internal data bus 392 into an address referred to by the second internal address bus 391.

When the data write from the microcomputer 350 to the internal shared memory 321 completes at a time $t_{156}$, the address outputted from the microcomputer 350 onto the address bus 351 refers to an address which is not on the internal shared memory 321, and consequently the external address decoder 370 outputs a "0" to the HLDRQ signal line 305. When the HLDRQ signal becomes "0", the SR-FF 383 outputs "0" to the HLDAK signal line 306. As mentioned hereinbefore, the write from the CPU 310 to the internal local memory 320 and the write from the microcomputer 350 to the internal shared memory 321 are performed in parallel.

Figure 14:
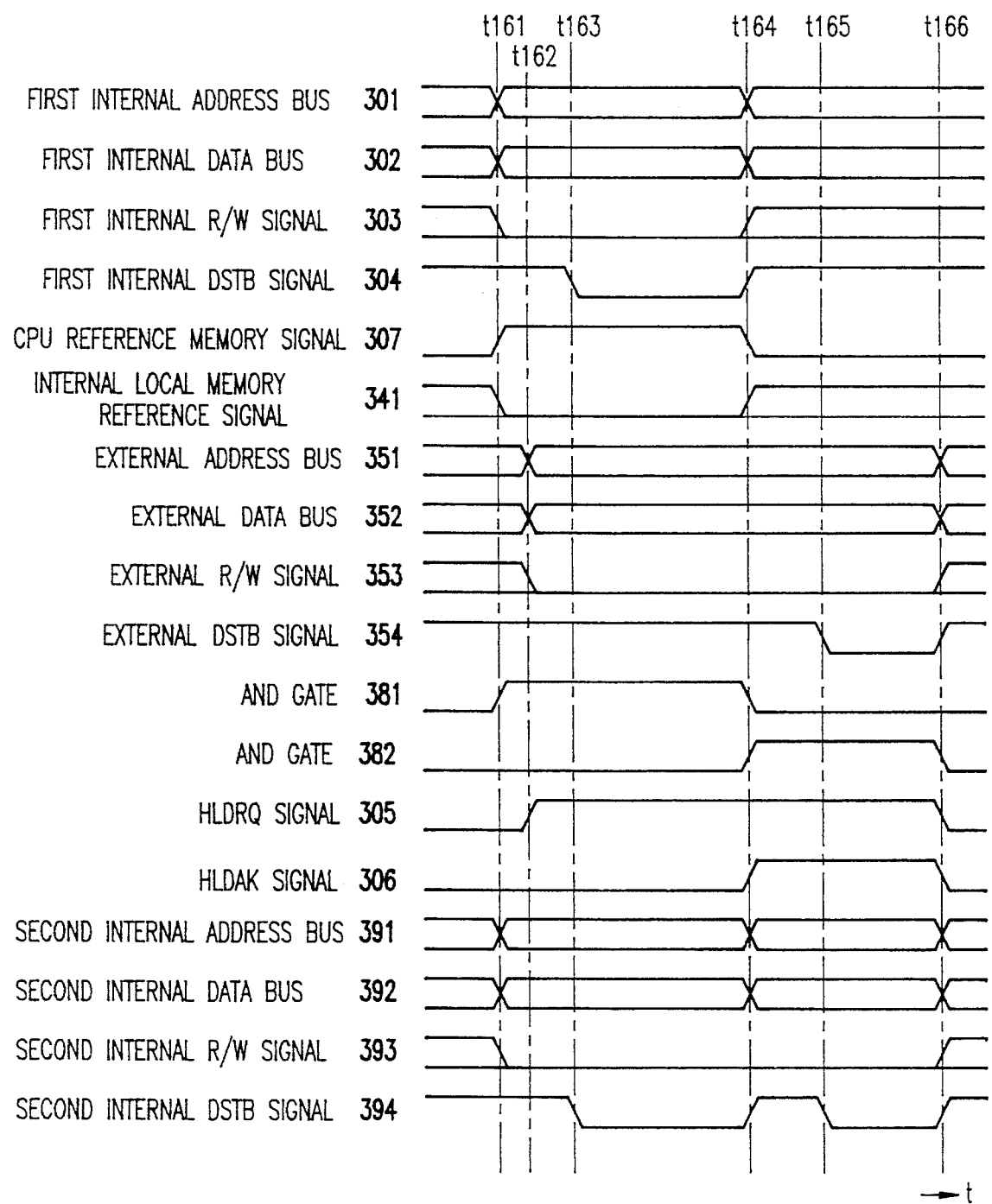
FIG. 14 is a timing chart explaining the operation of the embodiment of FIG. 9 when the external microcomputer references the internal shared memory of the first microcomputer while the internal CPU of the first microcomputer is writing to the internal shared memory of the first microcomputer.

FIG. 14 is a timing chart or the case where the microcomputer 350 references the internal shared memory 321 while the CPU 3 10 is performing a data write to the internal shared memory 321. At a time $t_{161}$, the CPU 310 a) outputs "0" (indicating a write operation) to the first internal R/W signal line 303, b) outputs an address which refers to the internal shared memory 321 onto the first internal address bus 301, c) places data on the first internal dam bus 302, and d) outputs a "1" to the CPU memory reference signal line 307. Since the address on the first internal address bus 301 refers to the internal shared memory 321, the internal address decoder 340 outputs a "0" to the internal local memory reference signal line 341. Then, at a time $t_{162}$, the microcomputer 350 starts a data write to the internal shared memory 321. Specifically, microcomputer 350 a) outputs a "0" (indicating a write operation) to the external R/W signal line 353, b) puts a memory address corresponding to the internal shared memory 321 onto the external address bus 351, and c) places the data to be written onto the external data bus 352. Since the address on the external address bus 351 refers to the internal shared memory 321, the address decoder 370 makes the HLDRQ signal on line 305 a "1". Since the CPU memory reference signal 307 is "1" and the internal local memory reference signal 341 is "0", the AND gate 381 outputs "1" until a time $t_{164}$ when the memory reference from the CPU 310 to the internal shared memory 321 completes. When the AND gate 381 outputs "1", the AND gate 382 outputs "0" and the SR-FF 383 maintains the HLDAK signal on line 306 at "0". Since the HLDAK signal on line 306 is "0", the microcomputer 350 stops the memory reference while maintaining the state of the bus. Further, since the HLDAK signal on line 306 is "0" until time $t_{164}$, the second internal bus becomes connected to the first internal bus. Then, during a period $t_{163}$–$t_{164}$, when the CPU 310 outputs an active level "0" to the first internal DSTB signal line 304, a "0" is outputted to the second internal DSTB signal line 394, and the internal shared memory 321 writes data which is on the second internal data bus 392 onto the address referred to by the second internal address bus 391, thereby completing a write operation from the CPU 310 to the internal shared memory 321.

When the data write from the CPU 310 to the internal shared memory 321 completes at a time $t_{164}$, the CPU memory reference signal 307 becomes "0", the AND gate 381 outputs "0", the AND gate 382 outputs "1" and the SR-FF 383 outputs "1" to the HLDAK signal line 306. When the HLDAK signal on line 306 becomes "1" at a time $t_{164}$, the second internal bus is connected to the external bus and the microcomputer 350 restarts the memory reference. When the microcomputer 350 outputs an active level "0" on external DSTB signal line 354 during a period $t_{165}$–$t_{166}$, "0" is outputted to the second internal DSTB signal line 394, the internal shared memory 321 writes data which is on the second internal data bus 392 to an address referred to by the second internal address bus 391, thereby completing a write from the microcomputer 350 to the internal shared memory 321.

Figure 15:
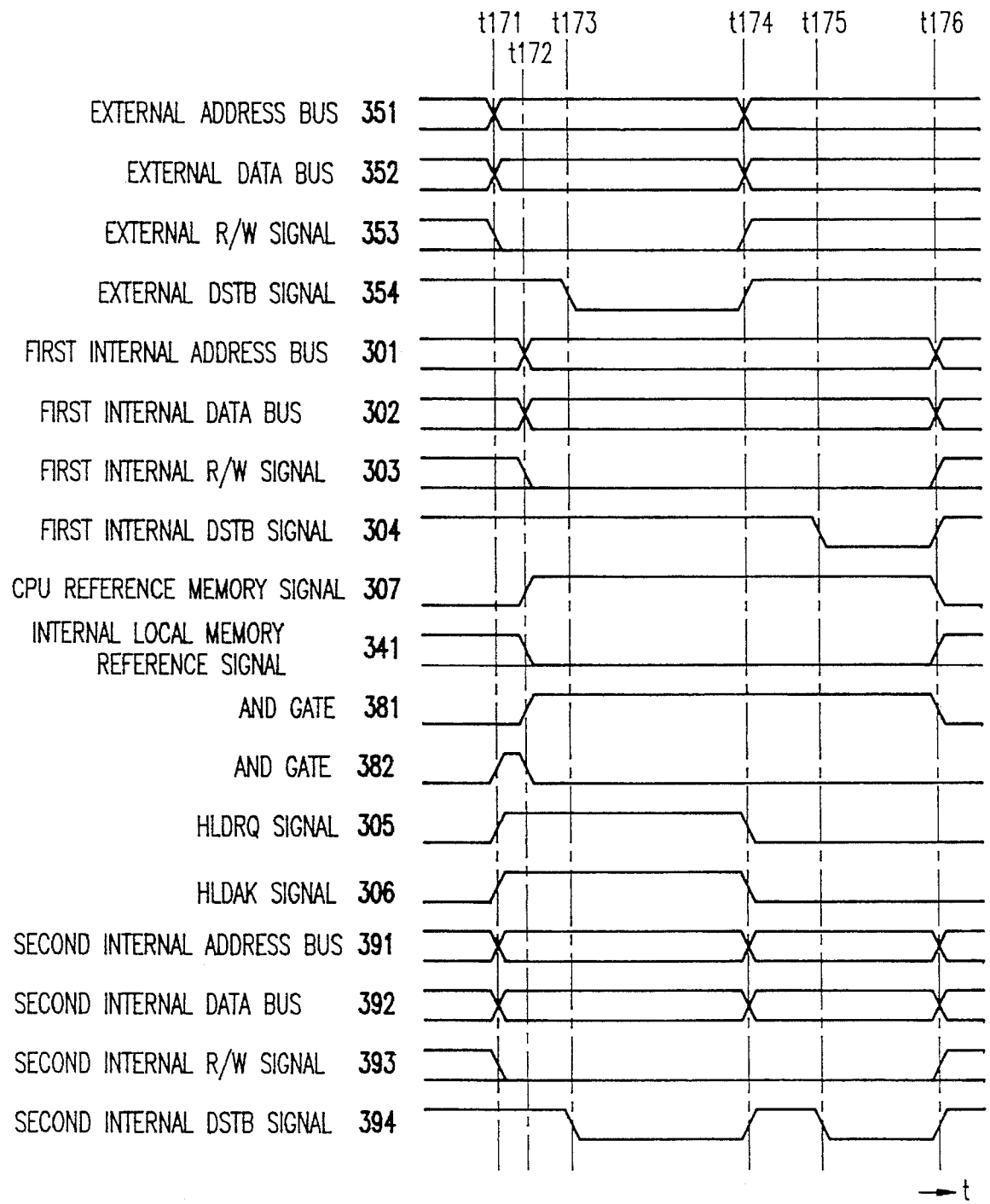
FIG. 15 is a timing chart explaining the operation of the embodiment of FIG. 9 when the internal CPU of the first microcomputer attempts to perform a data write to the internal shared memory of the first microcomputer while the external microcomputer is performing a data write to the internal shared memory of the first microcomputer.

FIG. 15 is a timing chart for the case where the CPU 310 performs a data write to the internal shared memory 321 while the microcomputer 350 is performing a data write to the internal shared memory 321. At a time $t_{171}$, microcomputer 350 a) outputs a "0" (indicating a write operation) to the external R/W signal line 353, b) outputs a memory address corresponding to the internal shared memory 321 onto the external address bus 351, and c) places data on the external data bus 352. Since the address on the external address bus 351 refers to the internal shared memory 321, the address decoder 370 makes the HLDRQ signal on line 305 "1". Since the CPU 310 is not performing a memory reference, the CPU memory reference signal on line 307 is "0", and the AND gate 381 outputs "0". Since the HLDRQ signal on line 305 is "1", the AND gate 382 outputs "1" and the SR-FF 383 outputs "1" to the HLDAK signal line 306. Then, at a time $t_{172}$, the CPU 310 a) outputs "0" (indicating a write operation) to the first internal R/W signal line 303, b) outputs a write address referring to the internal shared memory 321 onto the first internal address bus 301, and c) places write data onto the first internal data bus 302.

Since the address which is on the first internal address bus 301 refers to the internal shared memory 321, the internal address decoder 340 outputs a "0" to the internal local memory reference signal line 341. Since the HLDAK signal on line 306 is "1" and the internal local memory reference signal 341 is "0", the AND gate 384 outputs "1". As a result, the CPU 310 stops the memory reference while maintaining the bus state. Since the HLDAK signal on line 306 is a "1", the second internal bus is connected to the external bus and, when the microcomputer 350 outputs an active level "0" to the external DSTB signal line 354 during a period $t_{173}$–$t_{174}$, "0" is outputted to the second internal DSTB signal line 394, and the internal shared memory 321 writes data which is on the second internal data bus 392 to an address referred to by the second internal address bus 391, so that a write operation from the microcomputer 350 to the internal shared memory 321 is performed. When the dam write operation from the microcomputer 350 to the internal shared memory 321 terminates at a time $t_{174}$, the address on the address bus 351 outputted by the microcomputer 350 refers to an address other than an address in the internal shared memory 321, and the external address decoder 370 outputs a "0" as the HLDRQ signal. Since the HLDRQ signal is "0", the SR-FF 383 outputs a "0" to the HLDAK signal line 306.

When the HLDAK signal 306 becomes "0" at a time $t_{174}$, the second internal bus is connected to the first internal bus and, since the AND gate 384 outputs "0", the CPU 310 restarts the data write to the internal shared memory 321. When the CPU 310 outputs an active level "0" to the first internal DSTB signal line 304 during a period $t_{175}$–$t_{176}$, "0" is outputted to the second internal DSTB signal line 394, and the internal shared memory 321 writes dam which is on the second internal dam bus 392 to an address referred to by the second internal address bus 391, so that the write from the CPU 310 to the internal shared memory 321 is performed.

By using the microcomputer as described above, it is possible to perform a memory reference to the internal shared memory from both the internal CPU and the external microcomputer and to perform a memory reference from the internal CPU to the internal local memory simultaneously with a memory reference from the external microcomputer to the internal shared memory. As a result, by creating a program wherein data which is not necessary to be shared by the external microcomputer is stored in the internal local memory and the internal CPU executes an ordinary memory reference to the internal local memory, it is possible to execute the program without queuing the internal CPU even if there are frequent memory references from the external microcomputers to the internal shared memory, and to constitute a multi-processor microcomputer system which can transfer data between a plurality of microcomputers without substantially degrading the performance of the internal CPU.

While the invention has been described in terms of three preferred embodiments, those skilled in the art will recognize that the invention can be practiced with modification within the spirit and scope of the appended claims.

Having thus described our invention, what we claim as new and desire to secure by Letters Patent is as follows:

1. A multiprocessor system, comprising:

a first microcomputer including a central processing unit, an internal memory, a bus control unit, an internal bus interconnecting said central processing unit, said internal memory and said bus control unit, a set of first address terminals, a request signal input terminal, an acknowledge signal output terminal, and a strobe signal input terminal;

a second microcomputer including a set of second address terminals coupled via an address bus to said set of first address terminals of said first microcomputer, a strobe signal output terminal coupled via a strobe signal line to said strobe signal input terminal of said first microcomputer, and a ready signal input terminal, said second microcomputer transferring to said address bus, through said set of second address terminals, address information designating an address within said internal memory of said first microcomputer and transferring a strobe signal to said strobe signal line through said strobe signal output terminal in response to a ready signal supplied to said ready signal input terminal;

address decoding means coupled to said address bus for supplying, when decoding said address information transferred by said second microcomputer, a request signal to said request signal input terminal of said first microcomputer, said bus control unit of said first microcomputer responding to said request signal supplied to said request signal input terminal for detecting whether said internal bus is free from use by said central processing unit, and for outputting an acknowledge signal to said acknowledge signal output terminal when said internal bus is free; and ready signaling means coupled to said acknowledge signal output terminal for supplying said ready signal to said ready signal input terminal of said second microcomputer in response to said acknowledge signal outputted at said acknowledge signal output terminal and said request signal, said bus control unit of said first microcomputer further responding to said strobe signal transferred from said second microcomputer to said strobe signal input terminal through said strobe signal line to access an address of said internal memory by using said address information transferred to said set of first address terminals through said address bus and to perform a data read/write operation on said address of said internal memory through said internal bus.

2. The multiprocessor system according to claim 1, wherein said ready signaling means comprises:

a NAND gate having a first input terminal coupled to said request signal input terminal, a second input terminal coupled to said acknowledge signal output terminal, and an output terminal coupled to said ready signal input terminal.

3. The multiprocessor system according to claim 1, wherein said address bus includes a first address bus portion connected to said set of first address terminals of said first microcomputer and a second address bus portion connected to said set of second address terminals of said second microcomputer and wherein said strobe signal line includes a first strobe signal line connected to said strobe signal input terminal of said first microcomputer and a second strobe signal line connected to said strobe signal output terminal of said second microcomputer, said multiprocessor system further comprising a driver coupled between said first and second address bus portions and between said first and second strobe signal lines, said driver for electrically connecting said first address bus portion and said first strobe signal line, respectively, to said second address bus portion and said second strobe signal line in response to generation of said acknowledge signal and for disconnecting said first address bus portion and said first strobe signal line, respectively, from said second address bus portion and said second strobe signal line in response to termination of said acknowledge signal, said address decoding means being connected to said first address bus portion.

4. The multiprocessor system according to the claim 3, further comprising an external memory provided outside said first microcomputer and connected to said second address bus portion.

5. The multiprocessor system according to claim 1, wherein said internal bus includes first and second internal bus portions, said internal memory comprises an internal shared memory, and wherein said first microcomputer further includes a local memory and a bus drive circuit, said local memory being coupled through said first internal bus portion to said central processing unit, said internal shared memory and said bus control unit being coupled to said second internal bus portion, said bus drive circuit being coupled between said first and second internal bus portions for disconnecting said second internal bus portion from said first internal bus portion when said central processing unit accesses said local memory through said first internal bus portion to thereby release said second internal bus portion from said central processing unit so as to allow access to said internal shared memory by said second microcomputer.

6. The multiprocessor system according to claim 5, wherein said acknowledge signal is generated in response to said request signal when said first microcomputer is in one of a first state in which said central processing unit is accessing neither said internal shared memory nor said local memory, and a second state in which said central processing unit is accessing said local memory.

7. The multiprocessor system according to claim 6, wherein said first microcomputer further includes an internal address decoder coupled to said first internal bus portion for producing a first control signal when an access address from said central processing unit designates said local memory, said central processing unit generating a second control signal when said central processing unit accesses one of said local memory and said internal shared memory, said bus control unit including a gate circuit coupled to said internal address decoder, said central processing unit and said request signal input terminal, wherein said gate circuit generates said acknowledge signal in response to said request signal when said first control signal is generated or said second control signal is not generated.

8. The multiprocessor system according to claim 1, wherein said address bus includes a first address bus portion connected to said set of first address terminals of said first microcomputer and a second address bus portion connected to said set of second address terminals of said second microcomputer, and wherein said strobe signal line includes a first strobe signal line connected to said strobe signal input terminal of said first microcomputer and a second strobe signal line connected to said strobe signal output terminal of said second microcomputer.

9. The multiprocessor system according to claim 8, wherein said multiprocessor system further comprises a driver coupled between said first and second address bus portions and between said first and second strobe signal lines, said driver for electrically connecting said first address bus portion and said first strobe signal line, respectively, to said second address bus portion and said second strobe signal line in response to generation of said acknowledge signal and for disconnecting said first address bus portion and said first strobe signal line, respectively, from said second address bus portion and said second strobe signal line in response to termination of said acknowledge signal.

10. The multiprocessor system according to the claim 9, further comprising an external memory provided outside said first microcomputer and connected to said second address bus portion.

11. The multiprocessor system according to claim 1, wherein said internal bus includes first and second internal bus portions and said internal memory comprises an internal shared memory, and wherein said first microcomputer further includes a local memory and a bus drive circuit.

12. The multiprocessor system according to claim 11, wherein said acknowledge signal is generated in response to said request signal when said first microcomputer is in one of a first state in which said central processing unit is accessing neither said internal memory nor said local memory, and a second state in which said central processing unit is accessing said local memory.

13. The multiprocessor system according to claim 11, wherein said local memory is coupled through said first internal bus portion to said central processing unit, said internal shared memory and said bus control unit being coupled to said second internal bus portion.

14. The multiprocessor system according to claim 13, wherein said bus drive circuit is coupled between said first and second internal bus portions for disconnecting said second internal bus portion from said first internal bus portion when said central processing unit accesses said local memory through said first internal bus portion to thereby release said second internal bus portion from said central processing unit so as to allow access to said internal shared memory by said second microcomputer.

15. The multiprocessor system according to claim 11, wherein said first microcomputer further includes an internal address decoder coupled to said first internal bus portion for producing a first control signal when an access address from said central processing unit designates said local memory, said central processing unit generating a second control signal when said central processing unit accesses one of said local memory and said internal memory.

16. The multiprocessor system according to claim 15, wherein said bus control unit includes a gate circuit coupled to said internal address decoder, said central processing unit and said request signal input terminal, wherein said gate circuit generates said acknowledge signal in response to said request signal when said first control signal is generated or said second control signal is not generated.

* * * * *